C. S. STEARNS.
CARRIAGE WHEEL.

No. 86,709.  Patented Feb. 9, 1869.

Witnesses.  Inventor.

UNITED STATES PATENT OFFICE.

CALEB S. STEARNS, OF MARLBOROUGH, MASSACHUSETTS, ASSIGNOR TO HIMSELF AND CHARLES F. DAVIS, OF SAME PLACE.

IMPROVEMENT IN CARRIAGE-WHEELS.

Specification forming part of Letters Patent No. 86,709, dated February 9, 1869.

*To all whom it may concern:*

Be it known that I, CALEB S. STEARNS, of Marlborough, in the county of Middlesex and State of Massachusetts, have invented an Improvement in Carriage-Wheels, of which the following is a full, clear, and exact description, reference being had to the accompanying drawings, making part of this specification, in which—

Figure 1:
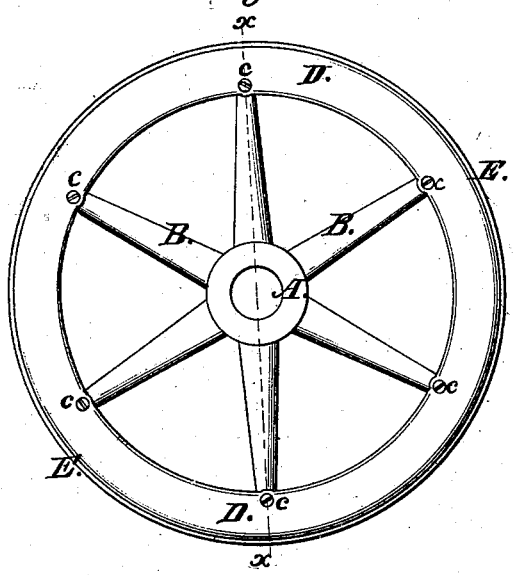
Figure 2:
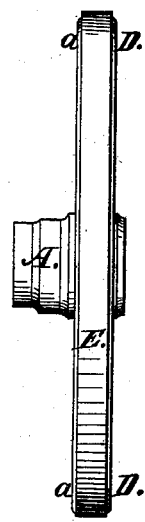
Figure 3:
Figure 4:
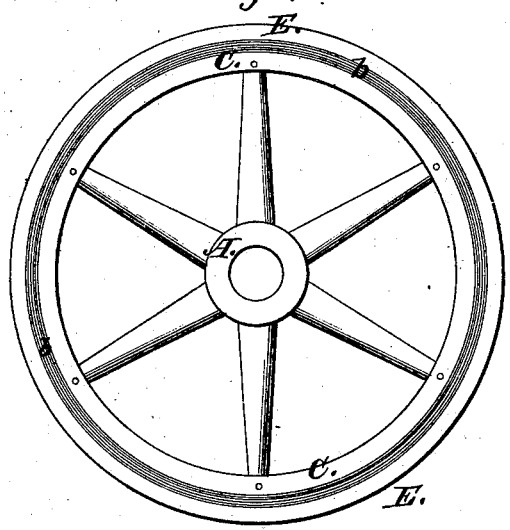
Figure 5:
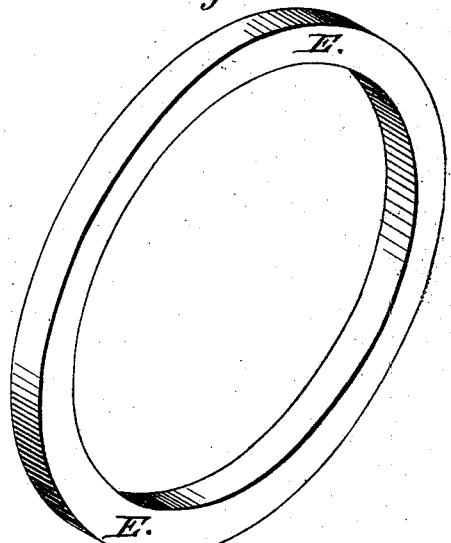

Figure 1 is a plan of my improved wheel. Fig. 2 is an end elevation of the same. Fig. 3 is a section on the line $x\,x$ of Fig. 1. Fig. 4 is a plan of the same with the annular plate removed to show the interior construction. Fig. 5 is a perpsective view of the tire.

My invention has for its object to relieve the concussion incident to carriage-wheels as ordinarily constructed when passing over rough ground; and it consists in the peculiar manner of confining a band of rubber or other suitable elastic material between the tire and the rim or felly of the wheel for the purpose of rendering it elastic, and thus reducing the wear upon all parts of the carriage.

To enable others skilled in the art to understand and use my invention, I will proceed to describe the manner in which I have carried it out.

In the said drawings, A represents the hub of my improved wheel; B, the spokes, and C the rim or felly, which is formed of malleable iron or other suitable material, and is provided on one side with a flange, $a$, between which and a removable annular plate, D, is fitted a thick steel ring, E, which forms the tire of the wheel. The interior diameter of the tire E is larger than that of the exterior diameter of the felly C, so as to leave a space between the two which is filled with a band of rubber or other suitable elastic material, $b$, fitted tightly in place, so as to prevent the tire from revolving independently of the wheel, the ordinary bolts for fastening the tire to the felly being dispensed with. The annular plate D is secured to the rim C by means of screws $c$, and when in place the rubber is securely confined on all sides, (see Fig. 3,) and serves to render the wheel elastic, thus greatly increasing its durability and causing a carriage provided with wheels so constructed to be relieved of much of the unpleasant jolting usually experienced in passing over uneven ground with wheels of the ordinary construction.

By the employment of wheels constructed as above described the expense and inconvenience of resetting or renewing the tires is entirely avoided; and my improved wheel will be found particularly applicable for heavy wagons and other similar vehicles.

In the drawings, the hubs, spokes, and felly of the wheel are represented as formed of one piece of metal; but in practice the hub and spokes may be of wood, as usual, and the rim or felly C of metal provided with suitable sockets for the reception of the ends of the spokes.

What I claim as my invention, and desire to secure by Letters Patent, is—

The combination of the rim or felly C with its flange $a$, the tire E, elastic material $b$, and removable plate D, all constructed and arranged substantially in the manner and for the purpose described.

CALEB S. STEARNS.

Witnesses:
N. W. STEARNS,
W. J. CAMBRIDGE.